(No Model.)
L. E. HOFFMAN.
CRANK SHAFT AND BEARING FOR BICYCLES.
No. 603,142. Patented Apr. 26, 1898.
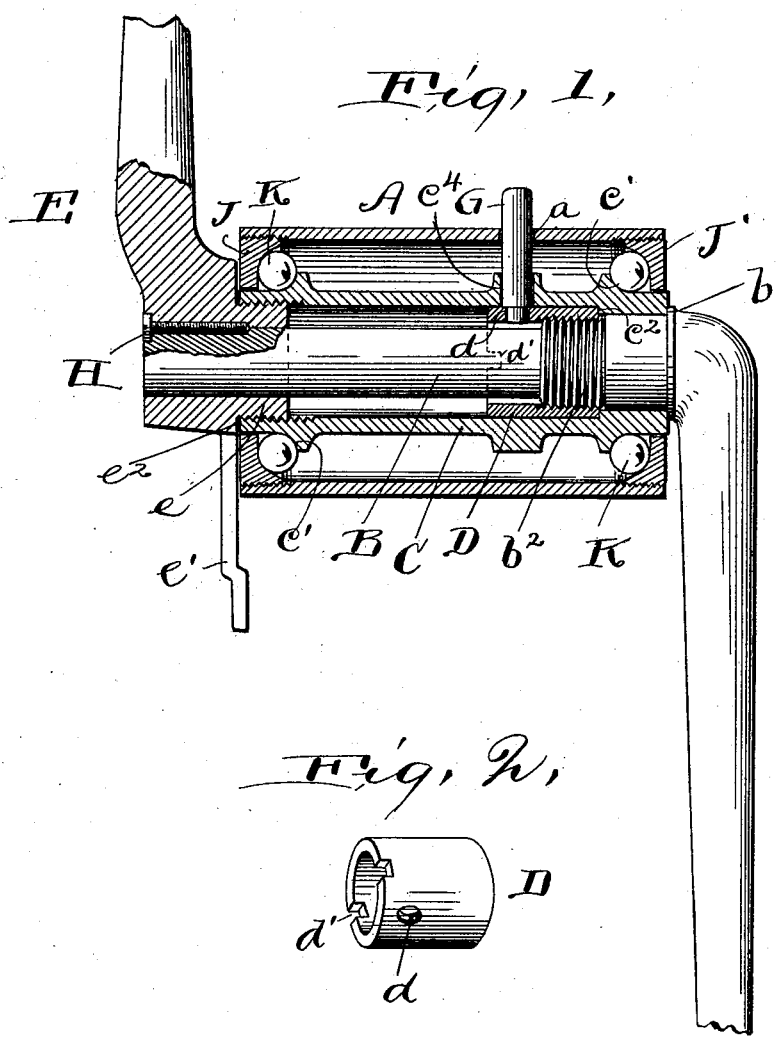

UNITED STATES PATENT OFFICE.

LOUIS E. HOFFMAN, OF CLEVELAND, OHIO.

CRANK-SHAFT AND BEARING FOR BICYCLES.

SPECIFICATION forming part of Letters Patent No. 603,142, dated April 26, 1898.

Application filed November 5, 1897. Serial No. 657,472. (No model.)

*To all whom it may concern:*

Be it known that I, LOUIS E. HOFFMAN, a citizen of the United States, residing at Cleveland, in the county of Cuyahoga and State of Ohio, have invented a certain new and useful Improvement in Crank-Shafts and Bearings for Bicycles, of which the following is a full, clear, and exact description, reference being had to the accompanying drawings.

This invention relates to an improvement in the crank-shaft and bearings therefor in bicycles and like vehicles, the object being to provide a simple construction of parts whereby they may be easily attached and detached to permit the withdrawal or replacement of said crank-shaft in its bearings.

The invention consists in the construction and combination of parts hereinafter described, and definitely pointed out in the claims.

In the drawings, Figure 1 is a vertical longitudinal sectional view through the crank-shaft and its bearings. Fig. 2 is a detached view of the nut which forms a part of said construction.

Referring to the parts by letters, A represents the usual tubular crank-hanger of a bicycle.

B represents the crank-shaft long enough to pass entirely through the crank-hanger, and $b$ represents a crank which is formed integral with said crank-shaft. On the crank-shaft near said crank is an external annular shoulder $b'$, and a short distance from this end of the crank-shaft, as at $b^2$, the crank-shaft is externally threaded.

C represents a spool upon which are formed the ball-bearing cones $c'$, which are located, respectively, near the end of said spool. $c^2$ represents an internal shoulder in said spool near that end which when the parts are assembled is adjacent to the integral crank $b$.

D represents a nut which fits somewhat loosely in the spool, but is larger in diameter than the shouldered part $c^2$ of said spool.

E represents a combined spider and crank which embraces the shaft B and has a threaded boss $e$ screwing into the threaded end of the spool C. One of the projecting arms of the spider is shown in the drawings at $e'$. The spider and crank are preferably made integral, as shown, though they may be separate pieces rigidly secured together by any suitable means. The spider furnishes means for the attachment of a sprocket or gear wheel, by which rotation is transmitted from the crank-shaft to the driving-wheel. An external shoulder $e^2$ on the spider is adapted to engage with the end of the spool.

In assembling the parts shown the nut D is inserted in the spool. The crank-shaft is passed through the spool, being screwed into the nut. During this operation the revolution of the nut may be prevented by means of a pin G, which passes through a hole $a$ in the crank-bracket, through a hole $c^4$ in the barrel, and into a hole $d$ in the nut. The revolution of this nut may, however, be prevented by other means—as, for example, by means of some device passing endwise into the barrel and engaging with the notches $d'$ in the end of the nut. When this nut is held against revolution, the crank-shaft is screwed into the nut until the shoulder $b'$ on the crank-shaft is brought up against the end of the spool and the nut is drawn against the internal shoulder $c^2$. Endwise movement of the shaft relative to the spool is thereby prevented, and the spool is clamped to the crank-shaft more or less firmly, so that it resists, if it does not prevent, the independent rotation of the crank-shaft and spool. The boss on the spider-hub $e$ is then screwed into the other end of the spool until the shoulder $e^2$ on the spider is brought against the end of the spool. During this operation the hub moves onto shaft B, which has been inserted into the axial hole in said hub. When the parts have thus been screwed into each other, the shaft B and the hub $e$ may be secured together by a screw H, which screws into a longitudinal hole formed partly in the hub and partly in the crank-shaft, so that the two are compelled to rotate together, or any other means for connecting these parts may be employed.

From the foregoing description it is obvious that the spool has been rigidly fastened to the crank-shaft, so that as the crank-shaft is revolved the spool also is revolved.

J J' are nuts which screw into the ends of the crank-bracket, these nuts having cupshaped inner faces which form part of the raceway for the balls K, the other parts of said raceways being the cones $c'$ on the spool.

I have shown in the drawings the spool C as consisting of a central sleeve and integral cones; but these cones might be separate pieces screwed, riveted, or otherwise secured to the sleeve.

Having described my invention, I claim—

1. The combination of a crank-hanger, a spool having bearings thereon, said spool having an internal shoulder and a threaded end, a nut in said spool engaging with said shoulder, a crank-shaft having a crank rigid with one end, an external shoulder on said end, and a threaded part which screws through said nut, a spider or crank which embraces the other end of said shaft and is screwed to said spool, and means for connecting said spider or crank and crank-shaft, substantially as specified.

2. The combination of a crank-hanger, a spool having bearings thereon, said spool having an internal shoulder and one internally-threaded end, a nut in said spool adapted to engage with said internal shoulder, a crank-shaft and a crank rigid therewith, said crank-shaft passing entirely through the spool, and having a threaded portion upon which the nut screws and an external shoulder adapted to engage with the end of the spool, a spider or crank which embraces the crank-shaft, and has a boss which screws into the threaded end of the spool, means for preventing the turning of the nut in the spool when the crank-shaft is being screwed in, means for preventing the rotation of the spool when the spider or crank is being screwed thereto, and means for connecting the spider or crank and crank-shaft, substantially as specified.

In testimony whereof I affix my signature in presence of two witnesses.

LOUIS E. HOFFMAN.

Witnesses:
E. B. GILCHRIST,
ALBERT H. BATES.